United States Patent
Bauer et al.

(10) Patent No.: US 6,199,442 B1
(45) Date of Patent: Mar. 13, 2001

(54) SLEWING RING BRAKE

(75) Inventors: Sebastian Bauer, Munich; Werner Harthauser, Wertingen, both of (DE)

(73) Assignee: Bauer Spezialtiefbau GmbH (DE)

( * ) Notice: Subject to any disclaimer, the term of this patent is extended or adjusted under 35 U.S.C. 154(b) by 0 days.

(21) Appl. No.: 09/276,754

(22) Filed: Mar. 26, 1999

(30) Foreign Application Priority Data

Mar. 26, 1998 (DE) .............................. 198 13 521

(51) Int. Cl.[7] .............................. F16H 57/10; B62C 7/04; B66C 23/84
(52) U.S. Cl. .............................. 74/411.5; 74/110; 188/31; 188/69; 192/225; 212/292
(58) Field of Search .............................. 74/110, 411.5, 74/530, 822; 188/31, 69; 192/225; 104/47; 212/292

(56) References Cited

U.S. PATENT DOCUMENTS

| | | | |
|---|---|---|---|
| 1,210,288 | * 12/1916 | Farr | 104/47 |
| 2,817,418 | * 12/1957 | Vial | 188/69 |
| 2,996,154 | * 8/1961 | Vial | 188/69 X |
| 3,545,628 | * 12/1970 | Dechantsreiter | 104/47 X |
| 3,664,515 | * 5/1972 | Orendorff et al. | 212/292 X |
| 3,739,652 | * 6/1973 | Caldwell et al. | 74/421 A |
| 3,819,018 | * 6/1974 | Muller et al. | 192/223 |
| 3,877,549 | * 4/1975 | Clark, Jr. | 188/38 |
| 5,046,534 | * 9/1991 | Vandenbroucke et al. | 188/69 X |
| 5,176,267 | * 1/1993 | Pech | 212/292 X |
| 6,010,018 | * 1/2000 | Pech | 212/292 |

* cited by examiner

Primary Examiner—Allan D. Herrmann
(74) Attorney, Agent, or Firm—Nixon Peabody LLP; Donald R. Studebaker

(57) ABSTRACT

A slewing ring brake for use in heavy machinery including earthworking machinery. The slewing ring brake includes a slewing ring with a tooth system and a support member which is mounted in a manner to allow rotary movement of the support member relative to the slewing ring. The slewing ring brake also includes a brake block displaceably mounted on the support member, the brake block being displaceable between a braking position and a freewheeling position. In the braking position, the brake block engages with the tooth system thereby preventing rotary movement of the support member relative to the slewing ring. In the freewheeling position, the brake block disengages the tooth system thereby allowing rotary movement of the support member relative to the slewing ring

15 Claims, 4 Drawing Sheets

SLEWING RING BRAKE

BACKGROUND OF THE INVENTION

1. Field of the Invention

The present invention relates to a slewing ring brake for use in heavy machinery including earthworking machinery. More particularly, the present invention relates to a brake for a slewing ring.

2. Description of Related Art

The use of a slewing ring in heavy machinery such as earthworking machinery is well known. In an excavator, for example, there is generally provided a fixed lower chassis and a rotatable upper chassis mounted in a rotary manner to the lower chassis. A circular track or a slewing ring having a tooth system on its outer circumference is generally fixedly attached to the lower chassis. The upper chassis generally includes gears which may be engaged with the tooth system and be rotationally actuated in order to allow rotation of the upper chassis with respect to the fixed lower chassis. This rotation may be actuated by a drive such as hydraulic motors. Thus, in order to rotate the upper chassis with respect to the lower chassis, it is only necessary for the drive to overcome the frictional torque and the moment of inertia of the mass. Therefore, it is relatively easy to rotate the upper chassis in this manner.

However, this relatively easily attained rotation of the upper chassis can cause serious problems in use of these heavy machineries such as earthworking machinery. For instance, if the upper chassis includes a fixed rotary drill for making a hole in the ground, a relatively high torque can act on the upper chassis during the drilling process. This high torque caused by drilling can cause an undesired rotation of the upper chassis with respect to the lower chassis. Of course, this can cause serious problems in safety and can significantly impair the accuracy of the drilled hole.

SUMMARY OF THE INVENTION

Therefore, the primary object of the present invention is to provide a slewing ring brake that will prevent undesired rotational movement between a slewing ring which may be mounted on a lower chassis and a support member which may be mounted on an upper chassis.

In accordance with one embodiment of the present invention, this object is achieved by a slewing ring brake having a slewing ring with a tooth system and a support member which is mounted in a manner to allow rotary movement of the support member relative to the slewing ring. In this embodiment, the slewing ring brake also includes a brake block displaceably mounted on the support member, the brake block being displaceable between a braking position and a freewheeling position. In the braking position, the brake block engages with the tooth system thereby preventing rotary movement of the support member relative to the slewing ring. In the freewheeling position, the brake block disengages the tooth system thereby allowing rotary movement of the support member relative to the slewing ring.

In the various embodiments of the present invention specifically illustrated, the brake block engages the tooth system of the slewing ring. As a result of this wedging action, rotary movement between the support member and the slewing ring is prevented. The brake block can be engaged with the tooth system on the slewing ring by radially displacement or even by axial displacement. In addition, whereas the described tooth system is normally an external tooth system, an internal tooth system is also possible on the circular slewing ring.

To prevent high stressing of a single tooth on the slewing ring and to ensure a durable slewing ring brake, the brake block in accordance with the present invention may be provided with several teeth constructed to mesh with the tooth system. The brake block is formed by a toothed section, which is shaped in correspondence to the tooth system on the slewing ring. For further relieving stresses in the individual teeth, there can also be several brake blocks which simultaneously engage the slewing ring.

It is fundamentally possible to operate the brake block manually, e.g. by means of a screw spindle. However, in accordance with a preferred embodiment of the present invention, a power operated driving unit is provided for displacing the brake block between the braking position and the freewheeling position. For instance, a linear displacement of the brake block can be attained by using an electric motor with a screw spindle or a recirculating ball screw. In accordance with the present illustrated embodiments, a simple driving unit can be comprised of a pressure cylinder with a displaceable piston rod connected to the brake block which displaces the brake block between the brake position and the freewheeling position.

In accordance with another embodiment of the present invention, the power operated driving unit includes at least one pressure cylinder and a transmission device for displacing the brake block in a radial direction substantially radial to the slewing ring. The transmission device converts a tangential displacement motion generated by the pressure cylinder which is substantially tangential to the slewing ring into a radial displacement motion substantially radial to the slewing ring. By having the displacement direction of the brake block at an angle of approximately 90° to the displacement motion of the pressure cylinder, a very robust construction of the slewing ring brake is attained through which a reliable braking is ensured, even in application of high torques.

In accordance with one embodiment of the present invention, the transmission device for the displacement of the brake block includes a toggle lever mechanism.

In an alternative embodiment, the transmission device includes a sliding wedge mechanism. In this embodiment, especially high forces can be applied to the slewing ring brake since there are no pivot pins or pivot bearings.

According to another embodiment of the present invention, a measuring device for sending rotary movement between the slewing ring and the support member may also be provided. The measuring device may be connected to a control unit through which the displacement of the brake block into the braking position may be prevented when rotary movement is sensed. This ensures that the brake is not operated during rotary movement between the slewing ring and the support member which could damage the tooth system of the slewing ring and the teeth of the brake block. Of course, the measuring device for monitoring rotary movement, particularly monitoring upper chassis rotation, can be located at any appropriate point including the illustrated position or alternatively, on the drive motor, on the transmission or on transmission shafts.

In accordance with the preferred embodiment of the present invention, the measuring device includes a rotatable measuring gear which meshes with the tooth system of the slewing ring and also includes a sensor for sensing rotation of the measuring gear. The sensor may be housed at a protected position at a distance from the slewing ring and may be an incremental encoder or transducer which can emit a pulse indicative of rotary motion on passing of the individual teeth of the measuring gear or a separate measuring disk. This particular embodiment provides a compact arrangement which is relatively simple to implement.

The slewing ring brake in accordance with the present invention is particularly useful in earthworking machinery applications. The slewing ring brake may be located on one of either a first chassis or a second chassis which are mounted in a manner to allow rotary movement between the two chassis. The slewing ring would be provided on the other chassis. For instance, the slewing ring brake may be provided on the upper chassis which houses a drill and be operated to prevent undesired rotation of the upper chassis with respect to the lower chassis during drilling.

These and other objects, features and advantages of the present invention will become more apparent form the following detailed description of the invention when viewed in conjunction with the accompanying drawings.

DETAILED DESCRIPTION OF THE PREFERRED EMBODIMENTS

Figure 1:
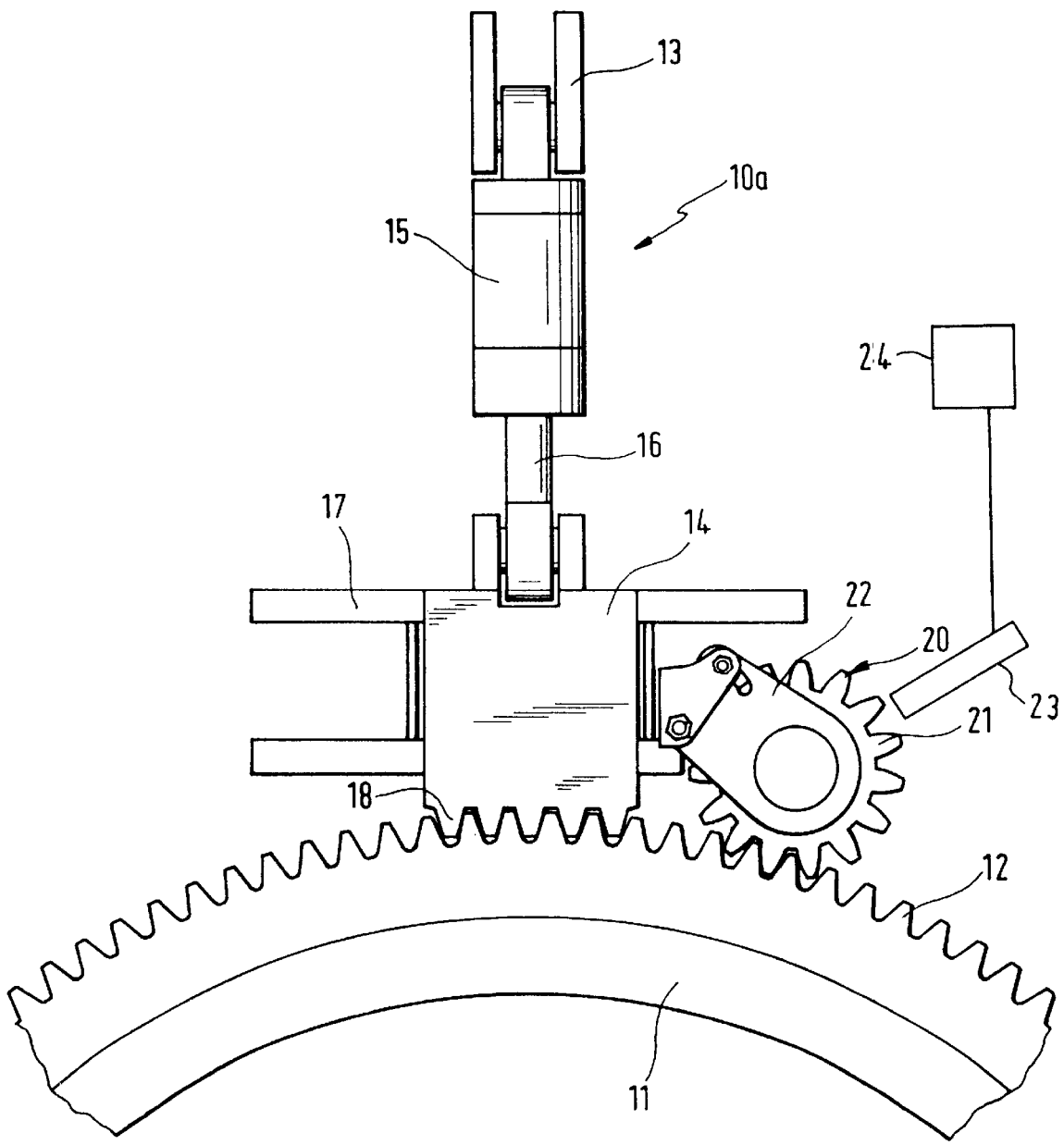
FIG. 1 shows a plan view of a slewing ring brake in accordance with the present invention having a directly driven brake block.

FIG. 1 shows a slewing ring brake 10a in accordance with the present invention which will prevent undesired rotational movement of an upper chassis relative to a lower chassis such as in earthworking machinery. As can be easily appreciated, only a small portion of the slewing ring 11 with a tooth system 12 is illustrated in detail in FIG. 1 since the slewing ring 11 may be relatively large in comparison to the slewing ring brake 10a. In addition, whereas the illustrated slewing ring 11 includes a tooth system 12 provided on the outer circumference of the slewing ring 11, the present invention, in all the various embodiments, may be just as easily be applied to a slewing ring having a tooth system provided on the inner circumference of the slewing ring.

The slewing ring brake 10a illustrated in FIG. 1 includes a brake block 14 with correspondingly constructed teeth 18 which mesh with the tooth system 12 of the slewing ring 11 and prevent relative rotation between the slewing ring 11 and the brake block 14. More than one tooth is provided on teeth 18 to reduce the stresses exerted on a particular tooth of the tooth system 12 as well as the teeth 18 thereby ensuring a durable slewing ring brake 10a. In this regard, the brake block 14 is displaceably arranged on a support member 13, only part of which is shown in FIG. 1. The support member 13 is fixedly attached to a rotatable structure such as an upper chassis which is rotatably mounted to a lower chassis with a fixedly mounted slewing ring 11. Consequently, the support member 13 is rotatable with respect to the slewing ring 11. Of course, in other applications, the mounting of the support member 13 and the slewing ring 11 may be reversed such that the slewing ring 11 may be attached to the upper chassis to rotates relative to the support member. However, in earthworking machinery, the slewing ring 11 is typically attached to the lower chassis which can be considered a first chassis whereas the upper chassis, which can be considered a second chassis, is usually rotatably mounted to the first chassis. A linear guide 17 formed by plates fixed to the support member 13 may also be provided to ensure linear movement. In the present illustrated embodiment, a power-operated driving unit such as a pressure cylinder 15 may be provided for controllably displacing the brake block 14. The pressure cylinder 15 may be mounted to the support member 13 on one end and mounted to the brake block 14 on the other end by means of a piston rod 16. The pressure cylinder 15 can be hydraulically or pneumatically operated. Of course, it can be easily appreciated that in this embodiment as well as the other embodiments which will be discussed below, the power-operated driving unit may also be other devices such as electrical motors with a screw spindle or a recirculating ball screw, cams, solenoids, piezoelectric devices and the like.

When the piston rod 16 is extended, the brake block 14 is moved into a braking position as clearly illustrated in FIG. 1. In this braking position, the teeth 18 of the brake block 14 engages (i.e. meshes) with the tooth system 12 of the slewing ring 11 thereby preventing the rotational movement of the slewing ring brake 10a and the corresponding support member 13 relative to the slewing ring 11. When the piston rod 16 is retracted, the brake block 14 is linearly and radially moved back along the linear guide 17 such that the teeth 18 of the brake block 14 disengages the tooth system 12 and there is a distance between the teeth 18 and the tooth system 12. In this freewheeling position, the slewing ring brake 10a and the corresponding support member 13 can be freely rotated relative to the slewing ring 11.

A measuring device 20 is provided on the support member 13 for measuring the relative rotational movement between the support member 13 and slewing ring 11. The measuring device 20 may be comprised of a measuring gear 21 mounted in rotary manner on a holder 22, which is in turn, fixedly attached to the support member 13. The rotational movement of the measuring gear 21 can be detected by a sensor 23 which may be connected to a control unit 24. This control unit can prevent the extension of the piston rod 16 of the pressure cylinder 15 if relative movement between the slewing ring 11 and support member 13 is detected by the sensor, i.e. rotation of the measuring gear 21 is sensed. This ensures that the slewing ring brake 10a is not operated during rotary movement between the slewing ring 11 and the support member 13 which could damage the tooth system 12 and the teeth 18. Of course, the measuring device 20 for monitoring rotary movement can be located at any appropriate point including the illustrated position or alternatively, on the drive motor, on the transmission or on transmission shafts (all not shown). The sensor (not shown) may be housed at a protected position at a distance from the stewing ring and may be an incremental encoder or transducer which can emit a pulse indicative of rotary motion on passing of the individual teeth of the measuring gear 21 or a separate measuring disk (not shown). This particular embodiment provides a compact arrangement which is relatively simple to implement.

It should also be recognized that the above described embodiment, as well as the embodiments described hereinbelow, may be further modified in accordance with the present invention. For instance, the various embodiments of the slewing ring brake may be modified such that the brake block is brought into engagement with the ring system of the slewing ring by being displaced in an axial direction or a combination of axial and radial directions. Moreover, more than one brake block may be provided to prevent rotary movement between the slewing ring and the support member to further increase the durability of the slewing ring and the slewing ring brake.

Figure 2:
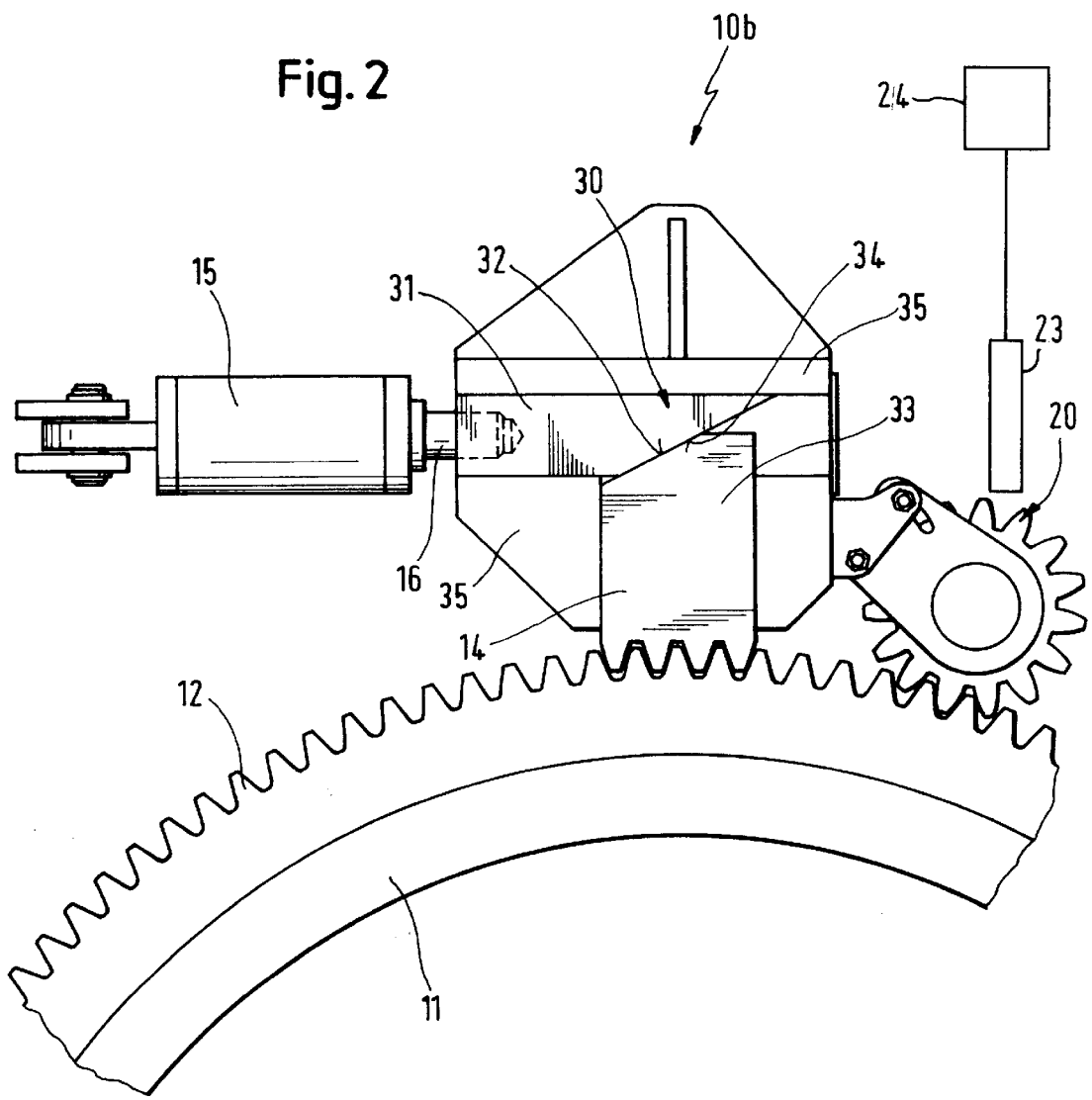
FIG. 2 shows a plan view of a slewing ring brake in accordance with another embodiment of the present invention having a sliding wedge mechanism.

FIG. 2 shows another slewing ring brake 10b in accordance with another embodiment of the present which is constructed in a corresponding manner to the slewing ring brake 10a illustrated in FIG. 1. The various components having corresponding similar functions are given the same reference numerals in this, and in the following embodiments, and thus, need not be explained further. As a modification of the previously described slewing ring brake 10a illustrated in FIG. 1, the slewing ring brake 10b includes a transmission device which displaces a brake block 14 in a radial direction substantially radial to the slewing ring 11 by converting a tangential displacement motion substantially tangential to the slewing ring 11 into a radial displacement motion substantially radial to the slewing ring 11. In this regard, the slewing ring brake 10b includes sliding wedge mechanism 30 interposed between the brake block 14 and a poweroperated driving unit such as a pressure cylinder 15 which provides the tangential displacement motion in the present embodiment. The sliding wedge mechanism 30 is provided on a piston rod 16 of the pressure cylinder 15 and includes a first wedge 31 with a first wedge surface 32 having an angle of approximately 60° to a longitudinal axis of the pressure cylinder 15. The first wedge surface 32 slidingly engages a second wedge surface 34 of a second wedge 33, which is formed on the brake block 14. The second wedge surface 34 may be at an angle of approximately 30° to the displacement direction of the brake block 14.

As previously noted, in this embodiment of the present invention, the movement of the piston rod 16 of the pressure cylinder 15 is in a direction tangential to the circular slewing ring 11 (toward the right in the illustrated orientation of FIG. 2). Upon extending the piston rod 16 out of the pressure cylinder 15, the brake block 14 is moved radially against the slewing ring 11 into a braking position due to the wedge surfaces 32, 34. More specifically, when the piston rod 16 is extended, the first wedge 31 is also displaced in the tangential direction (toward the right in the illustrated orientation of Figure. 2). The first wedge surface 32 contacts the second wedge surface 34 and radially displaces the second wedge 33 toward the slewing ring 11 (toward the bottom in the illustrated orientation of FIG. 2). In this manner, the brake block 14 is displaced until its teeth 18 engages the tooth system 12 of the slewing ring 11 thereby placing the slewing ring brake 10b in a braking position and preventing the rotational movement of the slewing ring brake 10b and the corresponding support member 13 relative to the slewing ring 11. By having the displacement direction of the brake block 14 being at an angle of approximately 90° to the displacement motion of the pressure cylinder 15, a very robust construction of the slewing ring brake 10b is attained through which a reliable braking is ensured, even during application of high torques. Moreover, especially high forces can be applied to the slewing ring brake 10b in this embodiment since there are no pivot pins or pivot bearings.

Through a corresponding retraction of the piston rod 16, the brake block 14 can be moved radially away from the slewing ring 11 so that the teeth 18 of the brake block 14 disengages the tooth system 12 of the slewing ring 11 thereby placing the slewing ring brake 10b in a freewheeling position and allowing freewheeling rotation of the slewing ring brake 10b and the corresponding support member 13 relative to the slewing ring 11. This retraction of the piston rod 16 may be assisted by additional action of a return spring (not shown). To ensure linear movement of the first wedge 31 and the second wedge 33, corresponding guide surfaces 35 formed by plates on the support member 13 are also provided in the illustrated example.

Moreover, the slewing ring brake 10b may also be provided with a measuring device 20 for measuring the relative rotational movement between the support member 13 and slewing ring 11 in the same manner as the previously discussed embodiment of the slewing ring brake 10a of FIG. 1. In addition, as in the previously discussed embodiment, this measuring device 20 may be used with a control unit (not shown) to prevent the actuation of the slewing ring brake 10b if relative movement between the slewing ring 11 and support member 13 is detected.

Figure 3:
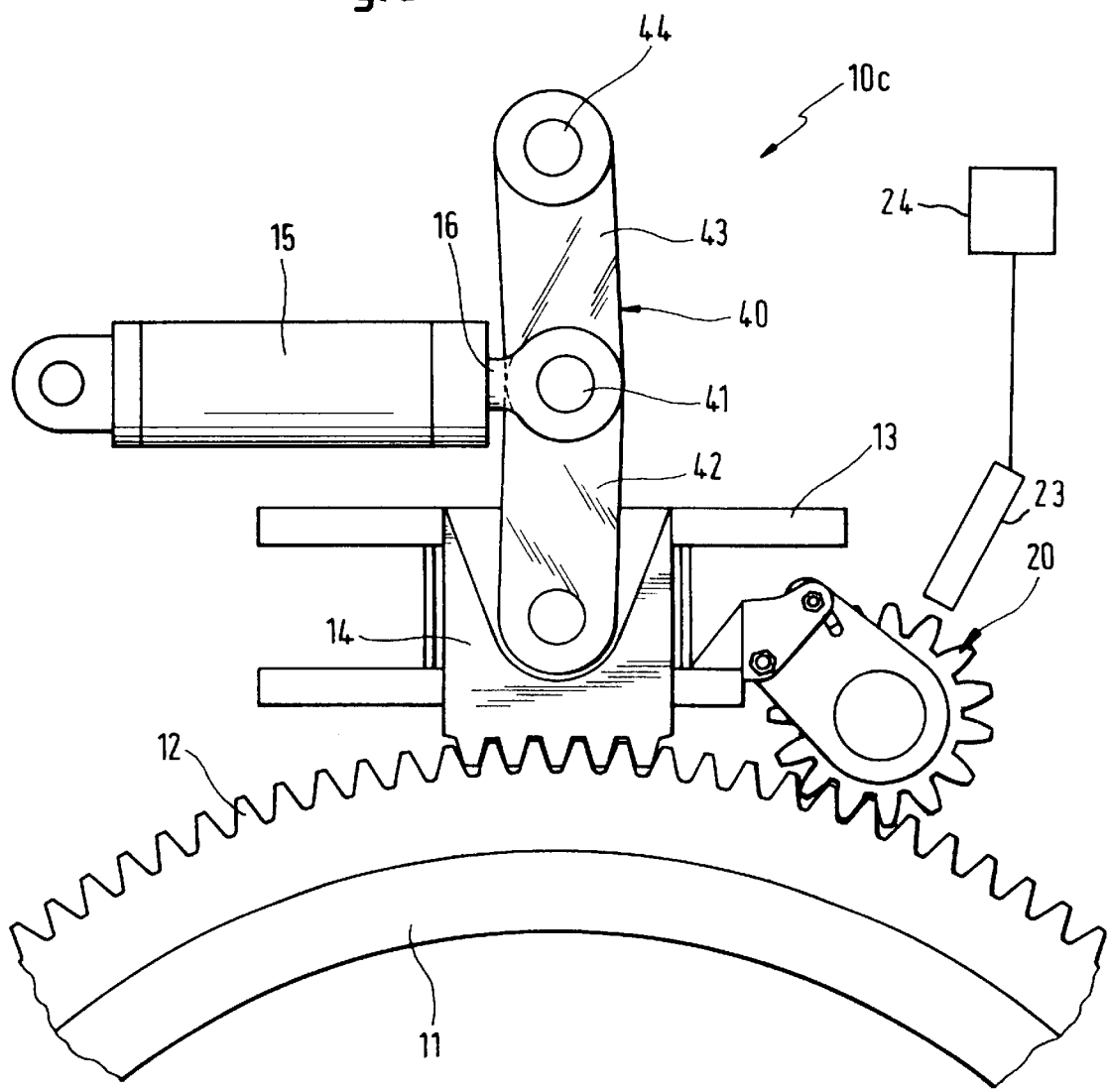
FIG. 3 shows a plan view of a slewing ring brake in accordance with another embodiment of the present invention having a toggle lever mechanism.

A slewing ring brake 10c in accordance with yet another embodiment of the present invention is illustrated in FIG. 3. In place of the previously described sliding wedge mechanism, a transmission device having a toggle lever mechanism 40 is provided for displacing a brake block 14 in a radial direction substantially radial to the slewing ring 11 by converting a tangential displacement motion substantially tangential to the slewing ring 11, into a radial displacement motion substantially radial to the slewing ring 11. In this regard, a control bolt 41 (mounted perpendicularly to the plane of the drawing) is attached to a piston rod 16 of a power-operated driving unit such as a pressure cylinder 15 which provides the tangential displacement motion in the present embodiment. Pivotably mounted on the control bolt 41 are a first toggle lever 42 and a second toggle lever 43 that extend in a substantially opposite directions from one another. The first toggle lever 42 extends roughly perpendicularly to the displacement direction of the piston rod 16 and in a radial direction toward the slewing ring 11. In addition, the first toggle lever 42 is pivotably connected to the brake block 14. The other end of the second toggle lever 43 is mounted on a bolt 44, which in turn, is rigidly connected to the support member 13.

The toggle lever mechanism 40 is constructed in such a way that when the piston rod 16 is retracted, the brake block 14 is forced radially into the braking position, as shown in FIG. 3. More specifically, when the piston rod 16 is retracted into the pressure cylinder 15, the first toggle lever 42 and the second toggle lever 43 are brought into an upright position as shown in FIG. 3 (i.e. substantially normal to a tangent of the slewing ring) from an angular position (not shown). It can be easily recognized that as the first toggle lever 42 and the second toggle lever 43 are moved from an angular position (not shown) into the upright position, the brake block 14 is radially displaced toward the 0slewing ring 11 (toward the bottom in the illustrated orientation of FIG. 3) until the teeth 18 of the brake block 14 engages the tooth system 12 of the slewing ring 11. Again, this engagement of the teeth 18 with the tooth system 12 places the slewing ring brake 10c in a braking position and prevents the rotational movement of the slewing ring brake 10c and the corresponding support member 13 relative to the slewing ring 11.

Upon extending the piston rod 16, the first toggle lever 42 and the second toggle lever 43 are brought into an angular position (not shown) such that the brake block 14 is radially displaced away from the slewing ring 11 (toward the top in the illustrated orientation of FIG. 3). This causes the disengagement of the teeth 14 on the brake block 14 with the tooth system 12 of the slewing ring 11 thereby placing the slewing ring brake 10c in a freewheeling position and allowing the freewheeling rotation of the slewing ring brake 10c and the corresponding support member 13 relative to the slewing ring 11.

Again, in the same manner as the previously discussed embodiments, the slewing ring brake 10c may also be provided with a measuring device 20 for measuring the relative rotational movement between the support member 13 and slewing ring 11. The measuring device 20 can be used to prevent the extension of the piston rod 16 of the pressure cylinder 15 if relative movement between the slewing ring 11 and support member 13 is sensed.

Figure 4:
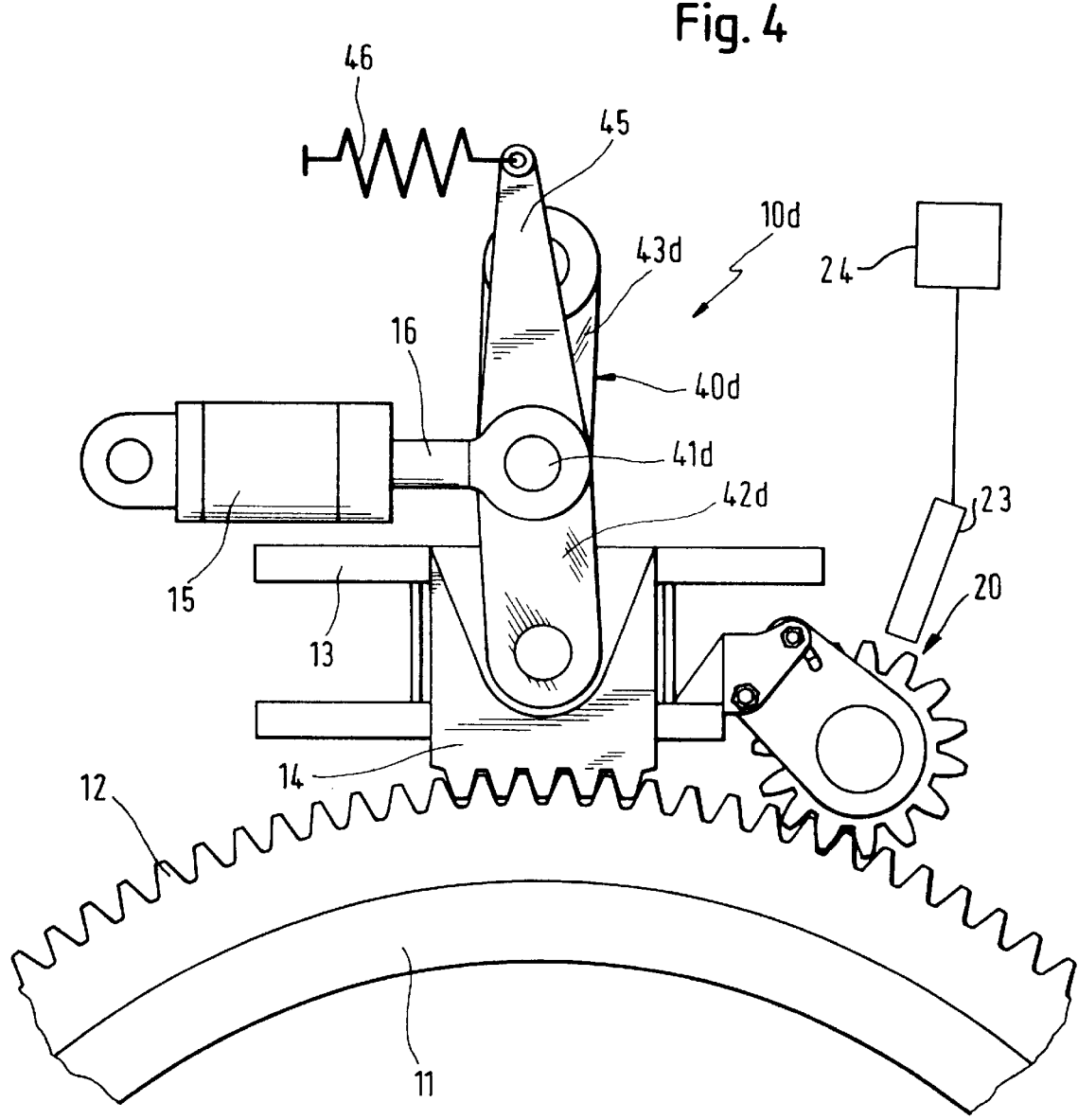
FIG. 4 shows plan view of a slewing ring brake in accordance with yet another embodiment of the present invention having a toggle lever mechanism and a spring return mechanism.

A slewing ring brake 10d with a modified toggle lever mechanism 40d is shown in FIG. 4. As can be seen, the slewing ring brake 10d is somewhat similar to the embodiment of the slewing ring brake 10c discussed previously. However, the toggle lever mechanism 40d with its first toggle lever 42d and its second toggle lever 43d is constructed in such a way that the slewing ring brake 10d is placed in a braking position when the piston rod 16 is extended from a power-operated driving unit such as a pressure cylinder 15. Thus, the first toggle lever 42d and the second toggle lever 43d are brought into an upright position as shown in FIG. 3 (i.e. substantially normal to a tangent of the slewing ring) from an angular position (not shown) by extending the piston rod 16 from the pressure cylinder 15. As the first toggle lever 42d and the second toggle lever 43d are brought into an upright position, the brake block 14 is radially displaced toward the slewing ring 11 until the teeth 18 of the brake block 14 engages the tooth system 12 of the slewing ring 11 thereby placing the slewing ring brake 10d in a braking position and preventing the rotational movement of the slewing ring brake 10d and the corresponding support member 13 relative to the slewing ring 11.

By retracting the piston rod 16 into the pressure cylinder 15, the first toggle lever 42d and the second toggle lever 43d are brought into an angular position (not shown) such that the brake block 14 is radially displaced away from the slewing ring 11 causing the disengagement of the teeth 18 on the brake block 14 with the tooth system 12 of the slewing ring 11 thereby allowing the freewheeling rotation of the slewing ring brake 10d and the corresponding support member 13 relative to the slewing ring 11.

The toggle lever mechanism 40d of the slewing ring brake 10d is also provided with a return lever 45, which at one end, is connected to a control bolt 41d and on the other end, is connected to a spring mechanism 46. In this particular embodiment of the slewing ring brake 10d, the spring mechanism 46 is tensioned through the extension of the piston rod 16. Thus, upon disconnecting the pressure within the pressure cylinder 15, the spring mechanism 46 acts upon the return lever 45 to return the piston rod 16 back into the pressure cylinder 15. Of course, as can be easily recognized, the brake block 14 is simultaneously pulled back in a radial direction away from the slewing ring 11. In this manner, the toggle lever mechanism 40d with the spring mechanism 46 ensures full retraction of the piston rod and full disengagement of the teeth 18 with the tooth system 12. Of course, like in the previously discussed embodiments, the slewing ring brake 10d may also be provided with a measuring device 20 for measuring the relative rotational movement which can be used to prevent the extension of the piston rod 16 of the pressure cylinder 15 if relative movement between the slewing ring 11 and support member 13 is detected.

While various embodiments in accordance with the present invention have been shown and described, it is to be understood that the invention is not limited thereto. These embodiments may be changed, modified and further applied by those skilled in the art. For instance, as noted previously, the various embodiments of the slewing ring brake may be modified such that the brake block is brought into engagement with the ring system of the slewing ring by being displaced in an axial direction or a combination of axial and radial directions. In addition, more than one brake block may be provided to prevent rotary movement between the slewing ring and the support member to further increase the durability of the slewing ring and the slewing ring brake.

Furthermore, the slewing ring brake in accordance with the present invention as described in the various embodiments above are particularly useful in earthworking machinery applications. The slewing ring brake may be located on either a first chassis or a second chassis which are mounted in a manner to allow rotary movement between them. The slewing ring would then be provided on the other chassis. For instance, the slewing ring brake may be provided on the upper chassis which houses a drill and be operated to prevent undesired rotation of the upper chassis with respect to the lower chassis during drilling. Of course, the slewing ring brake in accordance with the present invention may also be used in may other applications as well. Therefore, this invention is not limited to the details shown and described previously, but also includes all such changes and modifications which are encompassed by the appended claims.

What is claimed is:

1. A slewing ring brake comprising:
    a slewing ring having a tooth system,
    a support member mounted in a manner to allow rotary movement of said support member relative to said slewing ring,
    a brake block displaceably mounted on said support member, said brake block being displaceable between a braking position and a freewheeling position, and
    a measuring device for sensing rotary movement between said slewing ring and said support member, said measuring device being connected to a control unit for preventing displacement of said brake block into said braking position when rotary movement is sensed; said measuring device including a rotary measuring gear that meshes with said tooth system of said slewing ring and a sensor for sensing rotation of said measuring gear;
    wherein said brake block engages with said tooth system in said braking position thereby preventing rotary movement of said support member relative to said slewing ring and said brake block disengages said tooth system in said freewheeling position thereby allowing rotary movement of said support member relative to said slewing ring.

2. A stewing ring brake of claim 1, wherein said brake block includes teeth constructed to mesh with said tooth system.

3. A slewing ring brake of claim 1, further comprising a transmission device for displacing said brake block.

4. A slewing ring brake of claim 3, wherein said transmission device displaces said brake block in a radial direction substantially radial to said slewing ring by converting a tangential displacement motion substantially tangential to said stewing ring into a radial displacement motion substantially radial to said slewing ring.

5. A slewing ring brake of claim 3, wherein said transmission device for displacing said brake block includes a toggle lever.

6. A slewing ring brake of claim 3, wherein said transmission device for displacing the brake block includes a sliding wedge mechanism.

7. A slewing ring brake of claim 1, further comprising a power operated driving unit for displacing said brake block between said braking position and said freewheeling position.

8. A slewing ring brake of claim 7, wherein said power operated driving unit includes at least one pressure cylinder and a transmission device for displacing said brake block in a radial direction substantially radial to said slewing ring by converting a tangential displacement motion substantially tangential to said slewing ring generated by said pressure cylinder into a radial displacement motion substantially radial to said slewing ring.

9. A slewing ring brake of claim 8, wherein said transmission device for displacing said brake block includes at least one of a toggle lever and a sliding wedge mechanism.

10. A slewing ring brake for an earthworking machinery comprising:
- a slewing ring having a tooth system mounted on a first chassis of said earthworking machinery,
- a support member mounted on a second chassis of said earthworking machinery in a manner to allow rotary movement of said support member relative to said slewing ring,
- a brake block displaceably mounted on said support member, said brake block being displaceable between a braking position and a freewheeling position, and
- a measuring device for sensing rotary movement between said slewing ring and said support member, said measuring device being connected to a control unit for preventing displacement of said brake block into said braking position when rotary movement is sensed: said measuring device including a rotary measuring gear that meshes with said tooth system of said slewing ring and a sensor for sensing rotation of said measuring gear,
- wherein said brake block engages with said tooth system in said braking position thereby preventing rotary movement of said support member relative to said slewing ring and said brake block disengages said tooth system in said freewheeling position thereby allowing rotary movement of said support member relative to said slewing ring.

11. A stewing ring brake of claim 10, further comprising a power operated driving unit including at least one pressure cylinder and a transmission device for displacing said brake block in a radial direction substantially radial to said stewing ring by converting a tangential displacement motion substantially tangential to said stewing ring generated by said pressure cylinder into a radial displacement motion substantially radial to said stewing ring.

12. A stewing ring brake of claim 11, wherein said transmission device for displacing said brake block includes at least one of a toggle lever and a sliding wedge mechanism.

13. An earthworking machinery comprising:
- a first chassis including a slewing ring with a tooth system,
- a second chassis with a support member, said second chassis being attached to said first chassis in a manner to allow rotary movement of said support member relative to said slewing ring,
- a brake block displaceably mounted on said support member, said brake block being displaceable between a braking position and a freewheeling position,
- a measuring device for sensing rotary movement between said slewing ring and said support member, said measuring device including a rotary measuring gear that meshes with said tooth system of said slewing ring,
- a sensor for sensing rotation of said measuring gear, and
- a control unit for preventing displacement of said brake block into said braking position when rotary movement is sensed,
- wherein said brake block engages with said tooth system in said braking position thereby preventing rotary movement of said support member relative to said slewing ring and said brake block disengages said tooth system in said freewheeling position thereby allowing rotary movement of said support member relative to said slewing ring.

14. An earthworking machinery of claim 13, further comprising a power operated driving unit including at least one pressure cylinder and a transmission device for displacing said brake block in a radial direction substantially radial to said slewing ring by converting a tangential displacement motion substantially tangential to said slewing ring generated by said pressure cylinder into a radial displacement motion substantially radial to said slewing ring.

15. An earthworking machinery of claim 14, wherein said transmission device for displacing said brake block includes at least one of a toggle lever and a sliding wedge mechanism.

* * * * *